(12) United States Patent
Hageman et al.

(10) Patent No.: US 10,526,766 B2
(45) Date of Patent: Jan. 7, 2020

(54) WORK MACHINES AND METHODS AND SYSTEMS TO CONTROL AND DETERMINE A POSITION OF AN ASSOCIATED IMPLEMENT

(71) Applicant: Deere & Company, Moline, IL (US)

(72) Inventors: John M. Hageman, Dubuque, IA (US); Mark J. Cherney, Dubuque, IA (US); Michael G. Kean, Dubuque, IA (US); Mark E. Breutzman, Dubuque, IA (US); Tarik Loukili, Urbandale, IA (US); Michael D. Peat, Dubuque, IA (US)

(73) Assignee: Deere & Company, Moline, IL (US)

( * ) Notice: Subject to any disclaimer, the term of this patent is extended or adjusted under 35 U.S.C. 154(b) by 214 days.

(21) Appl. No.: 15/665,138

(22) Filed: Jul. 31, 2017

(65) Prior Publication Data

US 2019/0032305 A1 Jan. 31, 2019

(51) Int. Cl.
*E02F 9/20* (2006.01)
*E02F 3/84* (2006.01)
*E02F 3/76* (2006.01)
*E02F 9/26* (2006.01)
*A01B 79/00* (2006.01)

(52) U.S. Cl.
CPC .......... *E02F 9/2029* (2013.01); *E02F 3/7668* (2013.01); *E02F 3/7686* (2013.01); *E02F 3/845* (2013.01); *E02F 3/847* (2013.01); *E02F 9/2041* (2013.01); *E02F 9/265* (2013.01); *A01B 79/005* (2013.01); *E02F 9/205* (2013.01); *E02F 9/262* (2013.01)

(58) Field of Classification Search
CPC ....... E02F 9/2029; E02F 3/7668; E02F 9/265; E02F 3/7686; E02F 3/845; E02F 3/847; E02F 9/2041; E02F 9/205; E02F 9/262; A01B 79/005
See application file for complete search history.

(56) References Cited

U.S. PATENT DOCUMENTS

| 4,807,131 | A  | * | 2/1989  | Clegg ..................... E02F 3/842 172/4.5 |
|---|---|---|---|---|
| 6,655,465 | B2 |   | 12/2003 | Carlson et al. |
| 8,596,373 | B2 |   | 12/2013 | Montgomery et al. |
| 2013/0275035 | A1 |   | 10/2013 | Taylor et al. |
| 2015/0240453 | A1 | * | 8/2015 | Jaliwala ................ E02F 9/2041 701/50 |
| 2016/0319511 | A1 |   | 11/2016 | Chang et al. |
| 2017/0016211 | A1 |   | 1/2017 | Arimatsu et al. |
| 2018/0061040 | A1 | * | 3/2018 | Beery ..................... H04N 7/18 |

* cited by examiner

*Primary Examiner* — Russell Frejd
(74) *Attorney, Agent, or Firm* — Hanley, Flight & Zimmerman, LLC

(57) ABSTRACT

Work machines and methods and systems to control and determine a position of an associated implement are disclosed. An example work machine including a first vehicle component movable relative to a second vehicle component; and a processor to: cause the first vehicle component to move toward a commanded position; predict a first position of the first vehicle component of the work machine using first processes; determine a second position of the first vehicle component using second processes; and in response to a difference between the first position and the second position, to cause the first vehicle component to move further toward the commanded position to correct for the difference.

20 Claims, 12 Drawing Sheets

WORK MACHINES AND METHODS AND SYSTEMS TO CONTROL AND DETERMINE A POSITION OF AN ASSOCIATED IMPLEMENT

FIELD OF THE DISCLOSURE

This disclosure relates generally to work machines, and, more particularly, to work machines and methods and systems to control and determine a position of an associated implement.

BACKGROUND

Some work machines such as motor graders include an implement and/or a working blade used to grade and/or condition a surface. In some examples, the position of the working blade is controlled based on data received from position-determining masts extending from one or more sides of the working blade. In some examples, the masts include a sensor(s) such as a global positioning system (GPS) sensor and/or a laser receiver to enable the position of the working blade to be determined. These masts may be relatively large (e.g., three meters) and may be a target for thieves based on their cost and/or their removability from the work machine.

SUMMARY

An example work machine including a first vehicle component movable relative to a second vehicle component; and a processor to: cause the first vehicle component to move toward a commanded position; predict a first position of the first vehicle component of the work machine using first processes; determine a second position of the first vehicle component using second processes; and in response to a difference between the first position and the second position, to cause the first vehicle component to move further toward the commanded position to correct for the difference.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
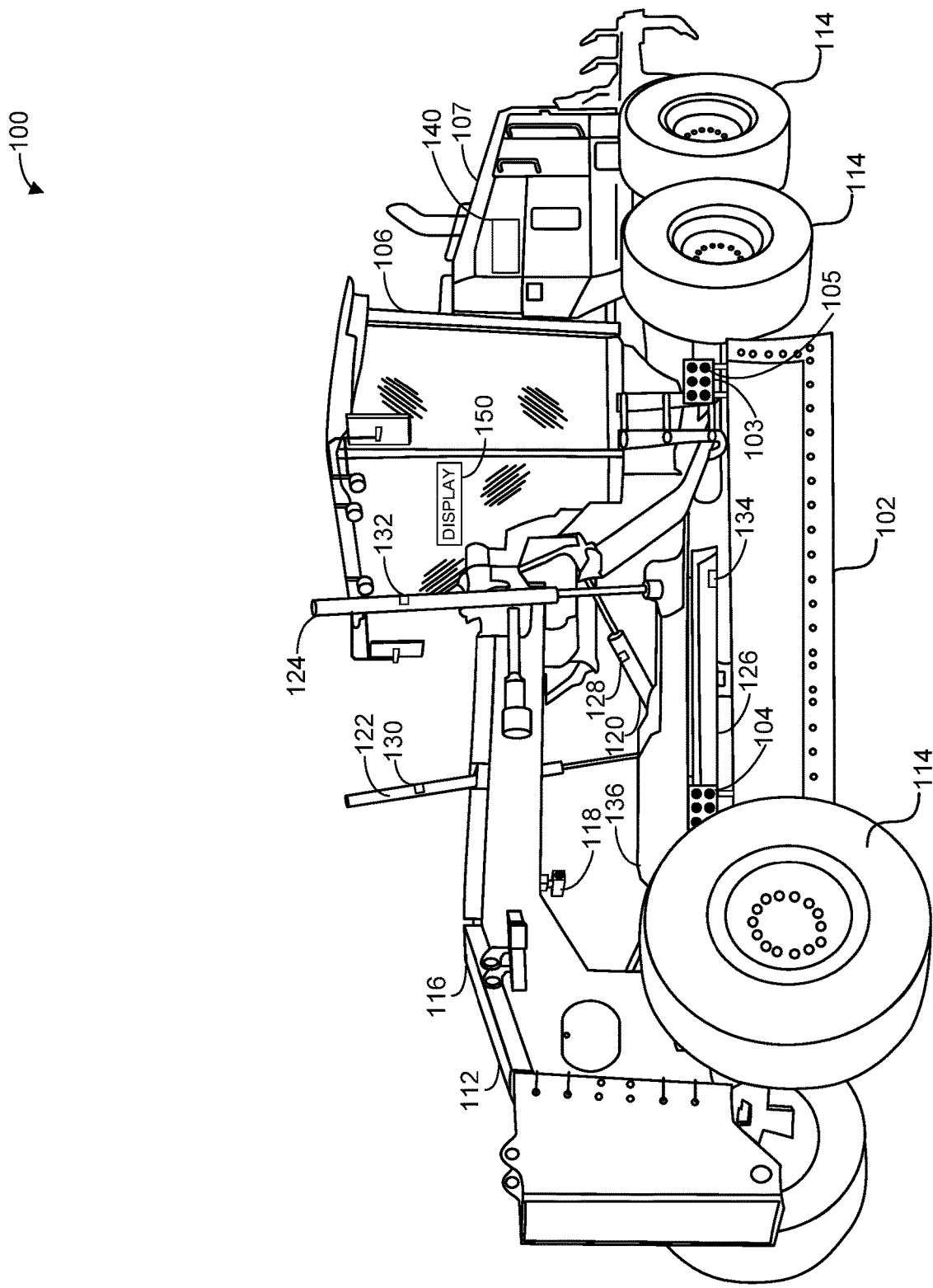
FIG. 1 illustrates an example work machine structured to implement the examples disclosed herein.

The examples disclosed herein relate to work machines such as, for example, motor graders including a working blade (e.g., a motor grader blade) that enable increased control in grading and/or conditioning a work surface. For example, the examples disclosed herein enable material to be distributed to satisfy a threshold depth and/or to satisfy a threshold smoothness. In some examples, the working blade is coupled to a draft frame and the draft frame is coupled to a main/machine frame of the motor grader. The working blade may be moved using a circle rotate and/or one or more actuators and/or cylinders. However, the working blade may be rotated, pivoted, translated and/or, more generally, moved in any suitable way.

To determine a position and/or orientation of a component of interest (e.g., the first vehicle component) such as a position and/or orientation of the working blade relative to the machine frame, in some examples, sensors are carried by one or more components of the work machine. The sensors may include a camera(s), a radio frequency module(s), a cylinder sensor(s) (e.g., a position encoder), a global positioning system (GPS) sensor(s), a rotation sensor(s) (e.g., an encoder), a linear position encoder(s) and/or a linear speed sensor(s). Additionally or alternatively, the sensors may include a hall effect sensor(s), a sensor(s) to perform a time of flight distance measurement(s), a radio wave sensor(s), an ultrasonic sensor(s), an infrared sensor(s), a laser receiver(s) and/or transmitter(s), an inertial measurement unit(s) (IMU) and/or a rotation sensor(s). Of course, additional or alternative sensors may be used to determine the position of a component of interest on the motor grader and/or on a work machine on which the examples disclosed herein are implemented.

In operation, in some examples, first processes predict a position and/or orientation of a first vehicle component of the work machine and second processes determine an actual position of the first vehicle component and/or a target(s) carried by the first vehicle component. Additionally or alternatively, in some examples, the first processes include determining a confidence level associated with the accuracy of the prediction, predicting where a fiducial(s) of the target(s) is to appear in image pixel space and/or predicting where a target(s) is to appear in an image. The first vehicle component may include a draft frame of the work machine, a working blade of the work machine and/or another component of interest.

The second processes may include processing image data and/or comparing image data to reference data to determine a position of the first vehicle component within a threshold level of accuracy. In some examples, the second processes include a camera(s) obtaining and processing an image(s) using image processing algorithms to determine the position of the first vehicle component. The images may be obtained at a relatively high rate (e.g., 10 frames per second) to enable substantially real-time tracking of the first vehicle component. As set forth herein, the phrase "substantially real-time tracking" accounts for transmission delay and/or processing time.

In some examples, processing the image(s) includes identifying a target(s) within the image(s), determining a scale parameter(s) that represents the size of the target(s) within the image and determining a position parameter(s) that relates a relative position of the first vehicle component, the second vehicle component, the camera(s) and/or the target(s). In some examples, the scaling parameter(s) and/or the position parameter(s) are determined using a pinhole model of the camera(s), where the position parameter(s) is used to relate two or more positions and/or orientations of the first vehicle component, the second vehicle component, the camera(s) and/or the target(s). The position parameter(s) and/or the scaling parameter(s) may be stored in a look-up table and/or a database.

In some examples, by comparing the predicted position of the first vehicle component to the measured/determined position of the first vehicle component, an accuracy of the prediction can be identified and/or any error present in the predicted value and/or the determined/measured value can be identified and/or corrected for. For example, when a difference (e.g., a residual value) is present between the predicted position and the determined/measured position, an actuator(s) can move the first vehicle component to the desired position to correct for the difference between where the desired position of the first vehicle component is (e.g., the prediction and where the first vehicle component actually is located). Specifically, in some examples in which a difference (e.g., a residual value) is present between the predicted position and the determined/measured position, a vector gain may be determined and used to correct the state of the work machine, where the state of the work machine includes the current position of the first vehicle component. The vector gain may be determined based on a measurement variance associated with error(s) in the image processing and/or a confidence level associated with the prediction (e.g., a state convariance).

By using both the first and second processes, the position and/or orientation of the first vehicle component and/or an associated target(s) can be determined with increased accuracy, for example. Further, by comparing the results of the first and second processes, in some examples, the first processes can be updated by applying proportional, derivative or integral gain to the error (e.g., the tracking error) and the result(s) added to the predicted position and/or orientation of the first vehicle component. In other words, the first processes can be updated and/or refined to account for error(s) in the prediction and/or to increase an accuracy of subsequent predictions, for example. In some examples, the error(s) identified is communicated to an individual (e.g., an operator) and/or a remote facility or, otherwise, stored.

FIG. 1 is a schematic illustration of an example work machine and/or vehicle 100 structured to implement the examples disclosed herein. In the illustrated example, the work machine 100 is implemented as a motor grader including an example working blade or implement 102, one or more example targets 103, 104 including fiducials 105, an example cab 106 and an example engine 107 used to propel the work machine 100 in different directions (e.g., forward, backward, etc.). In this example, the targets 103, 104 include six of the fiducials 105 having a circular and/or elliptical shape positioned in two rows of three. Of course, any number of the fiducials 105 having any shape (similar or different from one another) may be included. Additionally, in the illustrated example, the work machine 100 includes an example steering portion 112 that extends from the cab 106 and wheels and/or ground engaging elements 114. In some examples, the ground engaging elements 114 are implemented by tracks, wheels, tires, etc.

In this example, the steering portion 112 includes an example machine frame and/or a main frame 116 on which a camera(s) 118 is coupled. In some examples, the camera(s) 118 has relatively high resolution and/or is structured to enable pixel tracking. To enable the working blade 102 to be moved and/or rotated, in this example, actuators 120, 122, 124 and a circle rotate 126 are included.

To enable the position of the working blade 102 to be monitored, in some examples, an example first sensor 128 is coupled to and/or carried by the first actuator 120, an example second sensor 130 is coupled to and/or carried by the second actuator 122, an example third sensor 132 is coupled to and/or carried by the third actuator 124 and an example fourth sensor 134 is coupled to and/or carried by the circle rotate 126. One or more of the sensors 128, 130, 132, 134 may be implemented by a cylinder sensor, an encoder such as, for example, a rotary angle encoder or a linear encoder and/or an inertial sensor such as, for example, an accelerometer, a gyroscope and/or an IMU. While the sensors 128, 130, 132, 134 are depicted being carried by the actuators 120, 122, 124 and/or the circle rotate 126 in the illustrated example of FIG. 1, in other examples, one or more of the sensors 128, 130, 132, 134 may be positioned in different locations and/or additional or fewer sensors may be included.

In the illustrated example, the work machine 100 includes an example working blade position controller 140 that accesses blade position command requests from, for example, an operator of the work machine 100 and causes the working blade 102 to move toward the commanded position using one or more of the actuators 120, 122 and/or 124 and/or the circle rotate 126. In some examples, as the working blade 102 is being moved, example sensor data is accessed by the working blade position controller 140 and first processes are performed using the sensor data to predict a position of the working blade 102, the draft frame 136, the targets 103, 104 and/or another component of interest. In some examples, the sensor data includes motion data of how one or more components of the work machine 100 are moving and/or how one or more components of the work machine 100 are moving relative to one another. The sensor data may be associated with position data generated by the first sensor 128, the second sensor 130, the third sensor 132 and/or the fourth sensor 134.

To determine the accuracy of the prediction, in some examples, the working blade position controller 140 accesses example image data of the working blade 102 and/or the targets 103, 104 thereon from the camera 118 and performs second processes using the image data to determine a measured/determined/actual position of the working blade 102. For example, the working blade position controller 140 processes the image data 216 to identify the targets 103, 104 in an image(s) and/or compares the identified target(s) including its size, shape and/or relative position within the image, etc., to reference data to determine the actual position of the working blade 102, the draft frame 136, the targets 103, 104 or another component of interest. In some examples, the processes include determining the position of the working blade 102 in pixel space. In other words, the examples disclosed herein use two more processes to predict and/or determine/measure the position of the working blade 102 to increase the accuracy of the positioning of the working blade 102 without taking physical measurements of the work machine 100, for example.

To correct for an error(s) in the prediction and/or the first processes and in response to a comparison between the predicted position of the working blade 102 and the measured/determined position of the working blade 102, in some examples, the working blade position controller 140 generates an example working blade position correction command that causes the working blade 102 to correct for differences between two or more of the working blade position command request, the predicted position of the working blade 102 and/or the measured/determined position of the working blade 102. The one or more of the actuators 120, 122 and/or 124 and/or the circle rotate 126 may be used to move the working blade 102. In some examples, the first processes may be updated based on any difference between the predicted position of the working blade 102 and the determined position of the working blade 102 to increase the accuracy of subsequent predictions.

In the illustrated example, to provide information associated with the working blade 102 to an operator of the work machine 100, the working blade position controller 140 generates working blade position information displayable at an example display 150. In some examples, the working blade position information 220 includes information associated with the predicted position of the working blade 102, the measured/determined position of the working blade 102 and/or a difference (e.g., an error) between the predicted position of the working blade 102 and a measured/determined position of the working blade 102. Of course, the working blade position information 220 may include any other information and/or graphics associated with the working blade 102 that may be helpful to the operator of the work machine 100.

While the targets 103, 104 are illustrated as being carried by the working blade 102 in the illustrated example, the targets 103, 104 may be disposed in a different position. For example, the targets 103, 104 may be carried by, coupled to and/or integrated with the draft frame 136 and/or at any other location. While one camera(s) 118 is illustrated as being carried by the machine frame 116 in the illustrated example, more than one camera(s) 118 may be carried by the machine frame 116 and/or the camera(s) 118 may be disposed in a different position. For example, the camera(s) 118 may be carried by the cab 106 and/or the camera(s) 118 may be disposed in a different position. In other words, the camera(s) 118 may be disposed to obtain the image data 216 of the targets 103, 104 and more than one targets 103, 104 may be carried by the work machine 100 to obtain relatively accurate position information of the working blade 102 and/or another component of interest of the work machine 100.

While the example of FIG. 1 illustrates the work machine 100 as a motor grader, the work machine 100 may be implemented as any other vehicle. For example, the work machine 100 may be implemented as any type of work machine. For example, the work machine 100 may be implemented as a bull dozer, a harvester, a back hoe, an excavator, a loader, a compactor, a conveyor and/or agricultural equipment, etc. In some such examples, one or more of the targets 103, 104 are carried by the working implement and the camera(s) 118 is carried by the work machine in a position to enable the image data 216 of the targets 103, 104 to be obtained.

Figure 2:
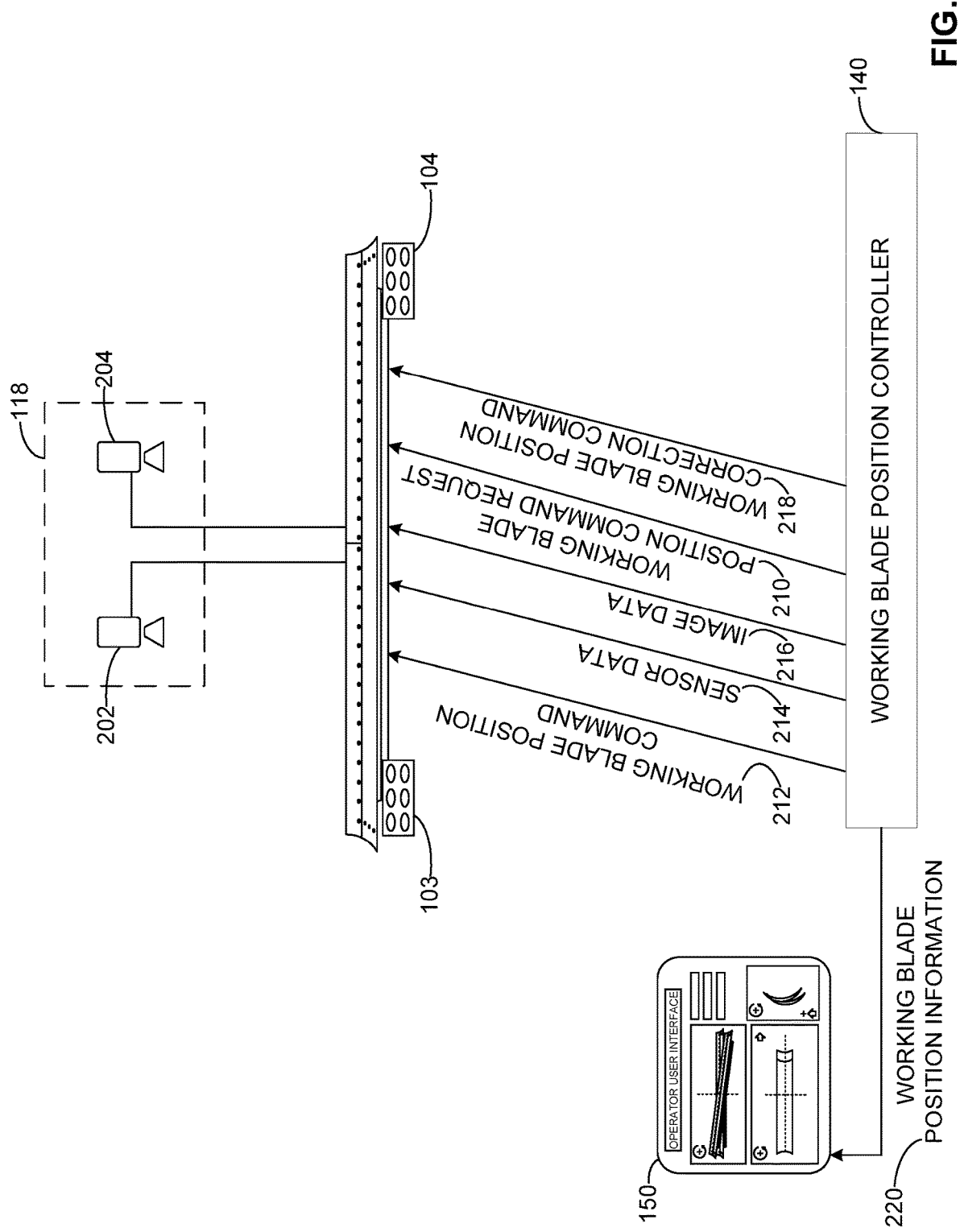
FIG. 2 illustrates a simplified overhead view of an example portion of a work machine including an example working blade position controller and an example display that can be used to implement the example work machine of FIG. 1.

FIG. 2 illustrates a simplified overhead view a portion of an example work machine that can be used to implement the example work machine 100 of FIG. 1. In this example, the example camera(s) 118 is implemented by example first and second cameras 202, 204 and the working blade 102 carries the first and second targets 103, 104.

In operation, in some examples, in response to a working blade position command request 210 received, the example working blade position controller 140 generates a working blade position command 212 that causes the working blade 102 to be moved to the commanded position using one or more of the actuators 120, 122 and/or 124 and/or the circle rotate 126. In some examples, as the working blade 102 is being moved, example sensor data 214 is accessed by the working blade position controller 140 and the first processes are performed using the sensor data 214 to predict a position of the working blade 102, the draft frame 136, the targets 103, 104 and/or another component of interest.

To determine the accuracy of the prediction, in some examples, the working blade position controller 140 accesses example image data 216 of the working blade 102 and/or the targets 103, 104 thereon from one or more of the cameras 202, 204 and performs second processes using the image data 216 to determine a measured/determined/actual position of the working blade 102. To correct for an error(s) in the prediction and/or the first processes and in response to a comparison between the predicted position of the working blade 102 and the measured/determined position of the working blade 102, in some examples, the working blade position controller 140 generates an example working blade position correction command 218 that causes the working blade 102 to correct for differences between two or more of the working blade position command request 210, the predicted position of the working blade 102 and/or the measured/determined position of the working blade 102. In the illustrated example, to provide information associated with the working blade 102 to an operator of the work machine 100, the working blade position controller 140 generates working blade position information 220 displayable at an example display 150.

Figure 3:
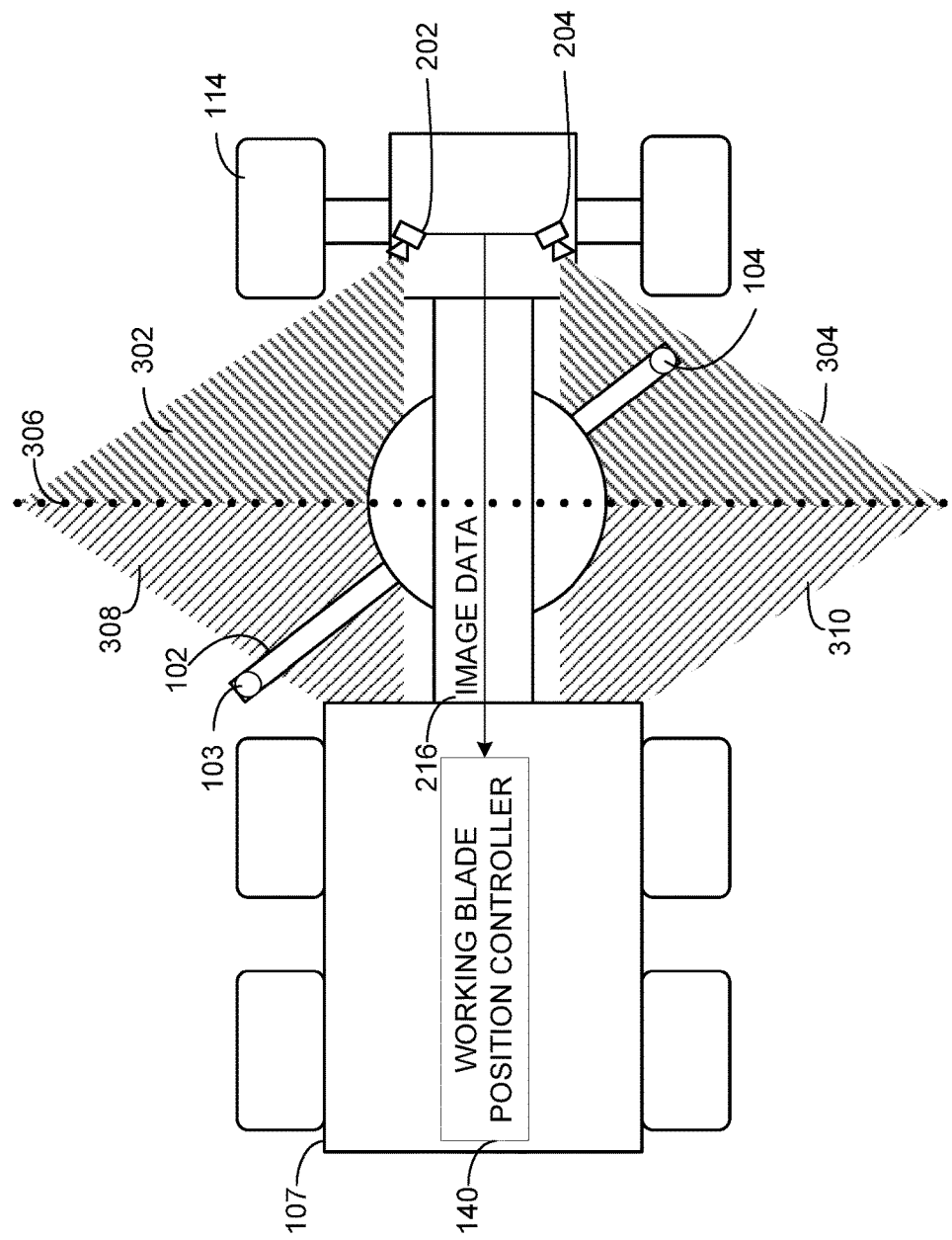
FIG. 3 is a simplified overhead view depicting camera detection ranges of example first and second cameras on an example work machine that can be used to implement the example work machine of FIG. 1.

FIG. 3 illustrates example detection ranges of first and second cameras 202, 204 of FIG. 2. In this example, the first camera 202 includes a first field of view (e.g., a first visual range) 302 and the second camera 204 includes a second field of view (e.g., a second visual range) 304. Also, in the illustrated example, a line 306 separates the first and second fields of view 302, 304 from first and second non-viewable areas 308, 310, where the first non-viewable area 308 is not viewable by the first camera 202 and the second non-viewable area 310 is not viewable by the second camera 204. Thus, when the working blade 102 is positioned such that the first target(s) 103 is disposed in the first non-viewable area 308 and the second target(s) 104 is disposed in the second viewable area 308, the image data 216 accessed by the working blade position controller 140 enables the working blade position controller 140 to determine the position of the working blade 102 based on the presence and/or absence of the target(s) 103, 104 within the image data 216 from the first and/or second cameras 202, 204 and/or a comparison with reference data.

Figure 4:
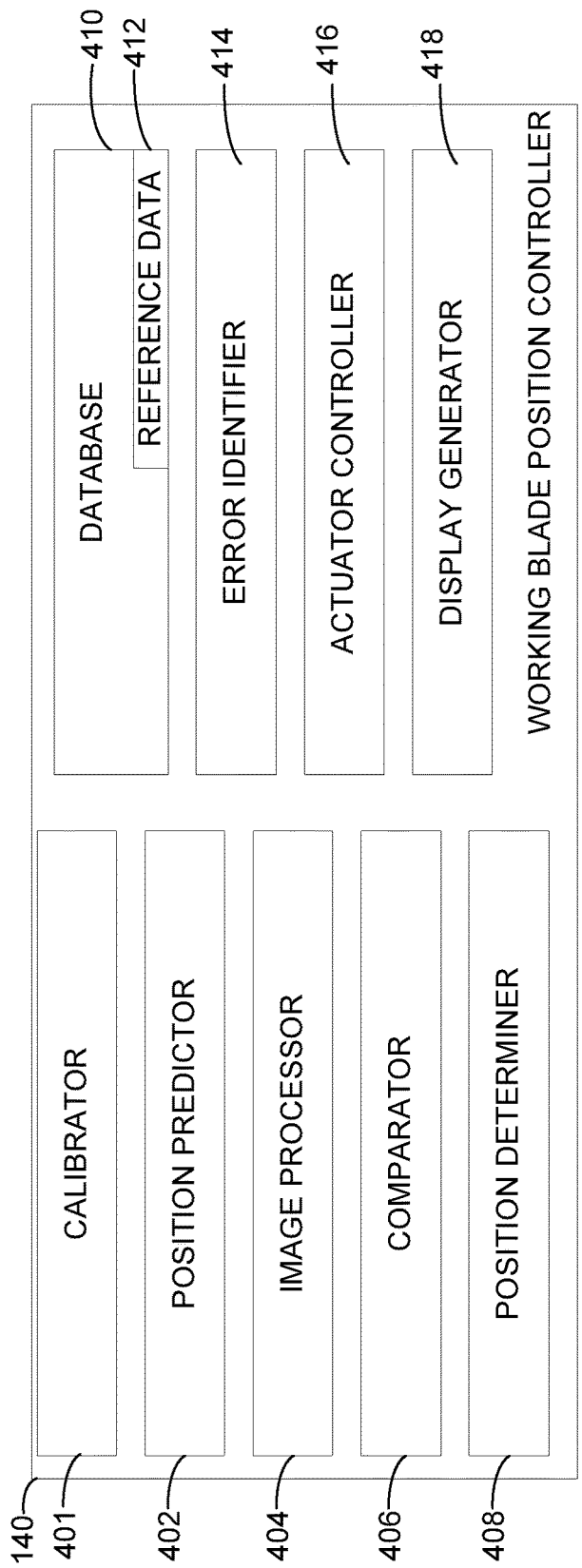
FIG. 4 illustrates an example working blade position controller that can be used to implement the example working blade position controller of the work machine of FIGS. 1 and/or 2.

FIG. 4 illustrates an example implementation of the example working blade position controller 140 of FIG. 1. In the illustrated example, the working blade position controller 140 includes an example calibrator 401, an example position predictor 402, an example image processor 404, an example comparator 406, an example position determiner 408, an example database 410 including example reference data 412, an example error identifier 414, an example actuator controller 416 and an example display generator 418.

To calibrate the example working blade position controller 140 and/or the position predictor 402, in some examples, the actuator controller 416 causes the working blade 102 to be moved to a known position and/or a neutral location. At the known location, the position predictor 402 predicts the position of the draft frame 136 relative to the machine frame 116 and/or the position of the targets 103, 104 and/or the position of the camera(s) 118. In some examples, the calibrator 401 compares the predictions to reference positions from the reference data 412. In examples in which an error(s) and/or a difference is identified, the calibrator 401 updates and/or calibrates the position predictor 402 to enable a more accurate position of the camera 118 and/or the targets 103, 104 to be determined and/or to enable more accurate predictions to occur.

The predictions made by the position predictor 402 may include a prediction of where one of the targets 103, 104 and/or the fiducials 105 are to appear in pixel space. Additionally or alternatively, the predictions made by the position predictor 402 may include a prediction of a position and/or orientation of the draft frame 136, the targets 103, 104, the camera(s) 118, the main frame 116 and/or another component(s) of the work machine 100. Additionally or alternatively, the predictions made by the position predictor 402 may include a relative position and/or orientation between two or more components of the work machine 100.

In response to the working blade position command request 210 received, in the illustrated example, the actuator controller 416 generates the working blade position command 212 that commands one or more of the actuators 120, 122 and/or the 124 and/or the circle rotate 126 to move the working blade 102 toward the commanded position. In some examples, as the working blade 102 is being moved, the example position predictor 402 uses the sensor data 214 to predict the position of the working blade 102, the position of the draft frame 136, the position of the machine frame 116 and/or the position of any other component of interest on the work machine 100. In some examples, the position predictor 402 uses a prediction model and/or a filter such as, a kalman filter and/or a complementary filter to perform the predictions. The predicted position of the component of interest may be stored in the database 410.

To determine when the working blade 102 has reached the commanded position, in some examples, the comparator 406 compares the predicted position to the commanded position. If the predicted position and the commanded position are within a threshold of one another, in some examples, the actuator controller 416 causes the actuators 120, 122, 124 and/or the circle rotate 126 to stop moving the working blade 102. If the predicted position and the commanded position are not within a threshold of one another, in some examples, the actuator controller 416 causes the actuators 120, 122, 124 and/or the circle rotate 126 to continue moving the working blade 102 toward the commanded position via the working blade position command 212.

Before, while and/or after the position predictor 402 predicts the position of working blade 102 and/or after the actuator controller 416 stops causing the working blade 102 to move, for example, in the illustrated example, the image processor 404 accesses the image data 216 and processes the image data 216 to identify aspects within the image such as, for example, a size of one or more of the targets 103, 104 within the image(s) and/or a location of one of one or more of the targets 103, 104 within the image, etc. In some examples, the image processor 404 processes the image data 216 to enable the target(s) 103, 104 to be more readily identifiable. For example, the image processor 404 may convert the images within the image data 216 to a black and white image(s) and/or increase and/or otherwise change the contrast of the image(s) within the image data 216. Additionally or alternatively, in some examples, the image processor 404 takes into account a parameter(s) of the camera(s) 118. Of course, the image processor 404 may process the image data 216 in different ways to enable the targets 103, 104 to be more readily identifiable and/or for the measured/determined position to have increased accuracy.

To determine a position of a component of interest on the work machine 100 and/or to determine the relative positioning between two or more components of the work machine 100 using the image data 216, in the illustrated example, the comparator 406 compares the processed image data 216 to the reference data 412. The component of interest may include the target 103, 104, the machine frame 116, the draft frame 136, the working blade 102, etc. In some examples, based on the comparison, the position determiner 408 determines the position of the component of interest (e.g., the draft frame 136, the working blade 102) and/or the relative position of two or more components of the work machine 100. In some examples, in determining the position of the component of interest, the position determiner 408 uses position and/or orientation data accessed from the database 410 of one or more of a position and/or orientation of the camera(s) 118 on the machine frame 116 and/or a position and/or orientation of the target(s) 103, 104 in an image frame and/or on the draft frame 136.

In some examples, the position determiner 408 may determine the measured/determined position of the working blade 102 or another component of interest based on the processed image data being similar and/or substantially similar to a reference image(s) contained in the reference data 412. The reference images and/or the associated position and/or orientation data may include the position and/or orientation of one or more of the target 103, 104, the machine frame 116, the draft frame 136, the working blade 102, etc. Additionally or alternatively, the reference images and/or the relative position and/or orientation data may include relative positions and/or orientations between one or more of the target 103, 104, the machine frame 116, the draft frame 136, the working blade 102, etc. For example, the position of the target(s) 103, 104 within an image determined based on the image processing may be used to determine an actual position of the machine frame 116, the draft frame 136, the working blade 102 and/or any other component of interest on the work machine 100. The position and/or orientation data may include one or more of a position and/or an orientation of the targets 103, 104 on the draft frame 136 and/or the position and/or an orientation of the targets 103, 104 relative to the machine frame 116.

To identify any error(s) or differences in the predicted position of the component(s) of interest and/or the measured/determined position of the component of interest, in the illustrated example, the comparator 406 compares the predicted position and the measured/determined position and the error identifier 414 identifies any differences between the predicted position and the measured/determined position. In some examples, the error identifier 414 takes into account error(s) in the reference data, error(s) in the image processing, error(s) in the prediction(s), etc. to enable the working blade 102 to be more accurately positioned and/or to enable a more accurate determination of a position of the working blade 102 to be determined.

In examples in which the error identifier 414 identifies a difference between the predicted position and the measured/determined position, the comparator 406 compares the measured/determined position of the working blade 102 and the commanded position of the working blade 102. If a difference between the measured/determined position and the commanded position are present, the actuator controller 416 generates the working blade position correction command 218 that causes the working blade 102 to move to account for the difference. Additionally or alternatively, in examples in which the error identifier 414 identifies a difference between the predicted position and the measured/determined position, the position predictor 402 performs an update process that accounts for the error(s) in the prediction. Thus, using the examples disclosed herein, the position predictor 402 is structured to learn and/or update a prediction model to enable further predictions to have an increased level of accuracy. Additionally or alternatively, using the examples disclosed herein, the image processor 404 and/or the position determiner 408 are structured to learn and/or update to enable further determinations to have an increased level of accuracy.

In some examples, the position predictor 402 and, more generally, the working blade position controller 140 uses a kalman filter and/or a complementary filter and/or other machine learning algorithms and/or capabilities. In examples in which the working blade position controller 140 uses a complementary filter, the position predictor 402 uses a high pass filter on the sensor data 214 and the image processor 404 and/or the position determiner 408 uses a low pass filter on the image data 216. In some such examples, an output of the position predictor 402 and/or a determined position of the vehicle component (e.g., the working blade 102, the draft frame 136) tends toward the image data 216 in a steady state condition and is supplemented by the sensor data 216 during a dynamic condition(s). In other words, in some examples, when the working blade 102 is stationary and/or in a steady state, the examples disclosed herein determine a position of the working blade 102 by processing the image data 216 and, when the working blade 102 is moving and/or in a dynamic state, the examples disclosed herein determine a position of the working 102 by processing the sensor data 214. Of course, the sensor data 214 may be processed and/or the used when the working blade 102 is stationary and/or in a steady state and the image data 216 may be processed and/or used when the working blade is moving and/or in a dynamic state.

In the illustrated example, the display generator 418 generates the working blade position information 220 displayable at the display 150. In some examples, the working blade position information 220 includes information associated with the predicted position of the working blade 102, the measured/determined position of the working blade 102 and/or a difference (e.g., an error) between the predicted position of the working blade 102 and a measured/determined position of the working blade 102.

While an example manner of implementing the working blade position controller 140 of FIG. 1 is illustrated in FIG. 4, one or more of the elements, processes and/or devices illustrated in FIG. 4 may be combined, divided, re-arranged, omitted, eliminated and/or implemented in any other way. Further, the example calibrator 401, the example position predictor 402, the example image processor 404, the example comparator 406, the example position determiner 408, the example database 410, the example error identifier 414, the example actuator controller 416, the example display generator 418 and/or, more generally, the example working blade position controller 140 of FIG. 4 may be implemented by hardware, software, firmware and/or any combination of hardware, software and/or firmware. Thus, for example, any of the example calibrator 401, the example position predictor 402, the example image processor 404, the example comparator 406, the example position determiner 408, the example database 410, the example error identifier 414, the example actuator controller 416, the example display generator 418 and/or, more generally, the example working blade position controller 140 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example calibrator 401, the example position predictor 402, the example image processor 404, the example comparator 406, the example position determiner 408, the example database 410, the example error identifier 414, the example actuator controller 416, the example display generator 418 and/or, more generally, the example working blade position controller 140 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example working blade position controller 140 of FIG. 1 may include one or more elements, processes and/or devices in addition to, or instead of, those illustrated in FIG. 4, and/or may include more than one of any or all of the illustrated elements, processes and devices.

Figure 5:
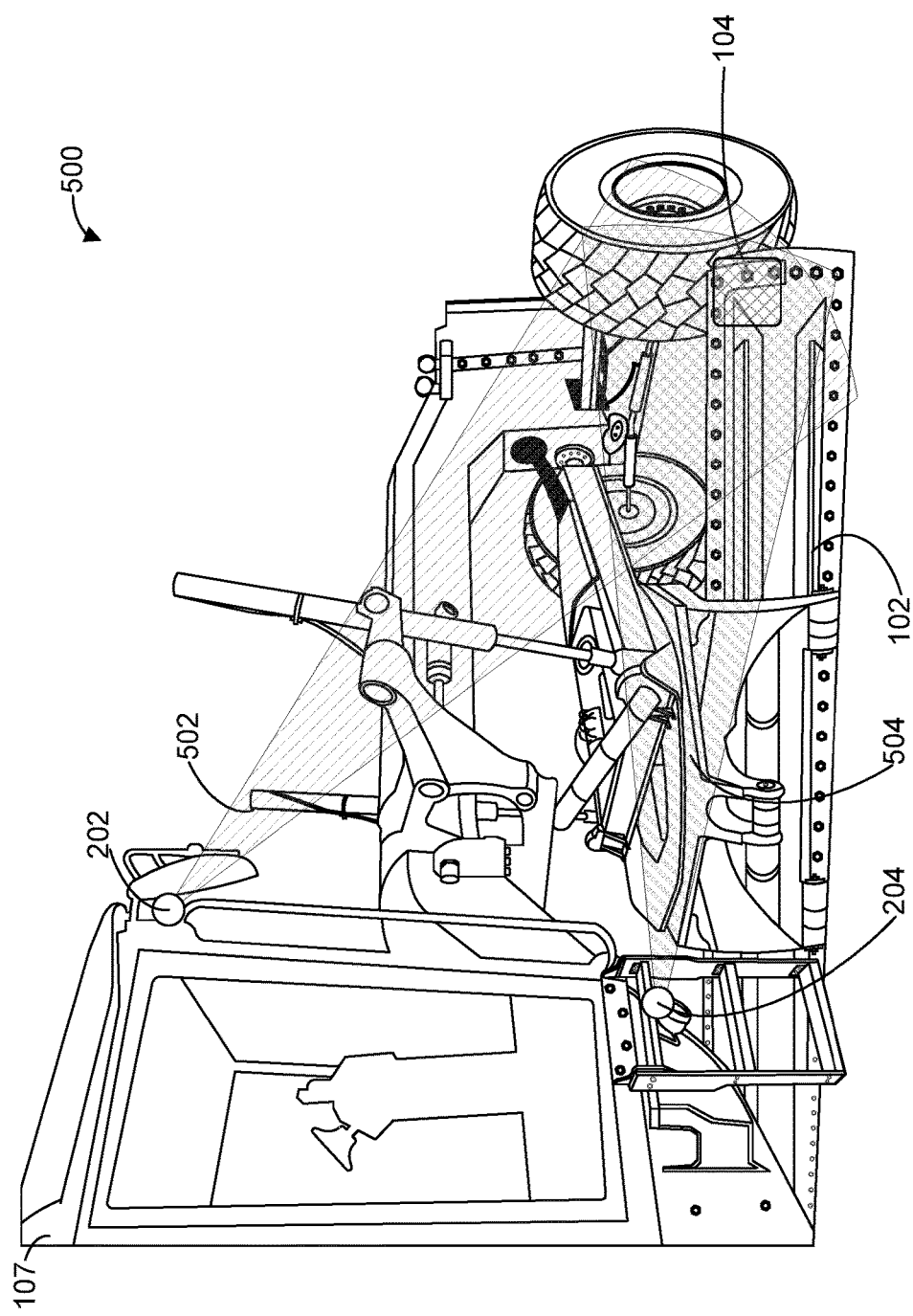
FIGS. 5-8 illustrate an example work machine including cameras in different positions to monitor one or more targets on one or more components of the work machine.

FIG. 5 illustrates an example work machine 500 that can be used to implement the work machine 100 of FIG. 1. In the example of FIG. 5, the work machine 500 includes the first and second cameras 202, 204 having alternative detection ranges as compared to the example of FIG. 3. In contrast to the examples of FIG. 3, the first camera 202 is carried adjacent a top of the cab 106 and the second camera 204 is carried adjacent a bottom of the cab 106 where both the first and second cameras 202, 204 are directed toward one side (e.g., the right side) of the work machine 500. As set forth herein, the term "adjacent" means that one structure is within a threshold distance (e.g., 0.0 inches, 0.2 inches, 1.0 inch, 1 foot, etc.) of another structure. In the illustrated example, the first camera 202 includes a first field of view (e.g., a first visual range) 502 and the second camera 204 includes a second field of view (e.g., a second visual range) 504. In the position of the working blade 102 shown in FIG. 5, the targets 104 is included in the first and second fields of view 502, 504.

Figure 6:
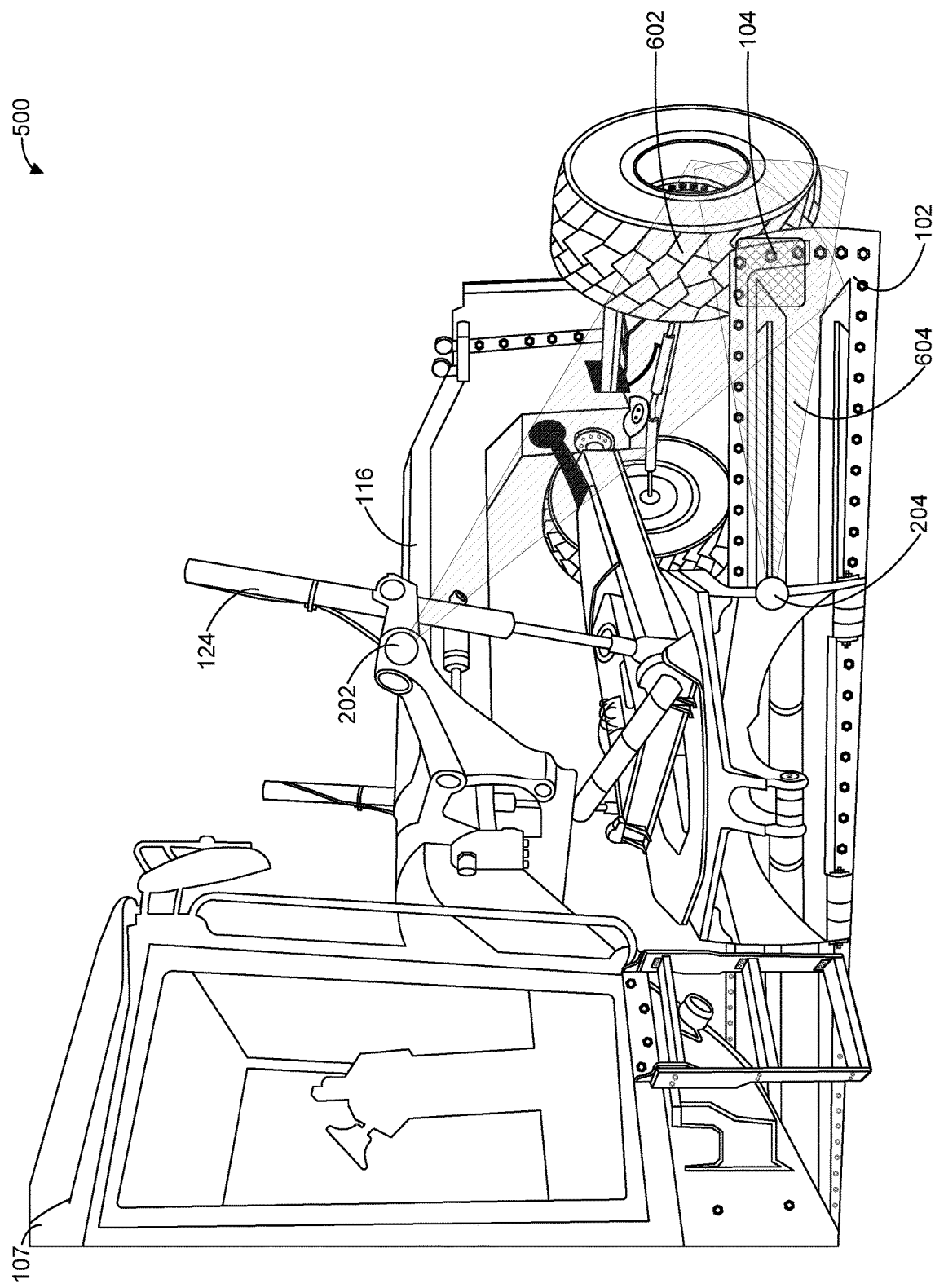

FIG. 6 illustrates the example work machine 500 of FIG. 5 with the first and second cameras 202, 204 in different locations as compared to FIG. 5. As shown in the example of FIG. 6, the first camera 202 is coupled adjacent the third actuator 124 to provide the first camera 202 with a first field of view 602 of the targets 103, 104 and the second camera 204 is coupled adjacent the working blade 102 to provide the second camera 202 with a second field of view 604 of the targets 103, 104. In the position of the working blade 102 shown in FIG. 6, the target 104 is included in the first and second fields of view 602, 604.

Figure 7:
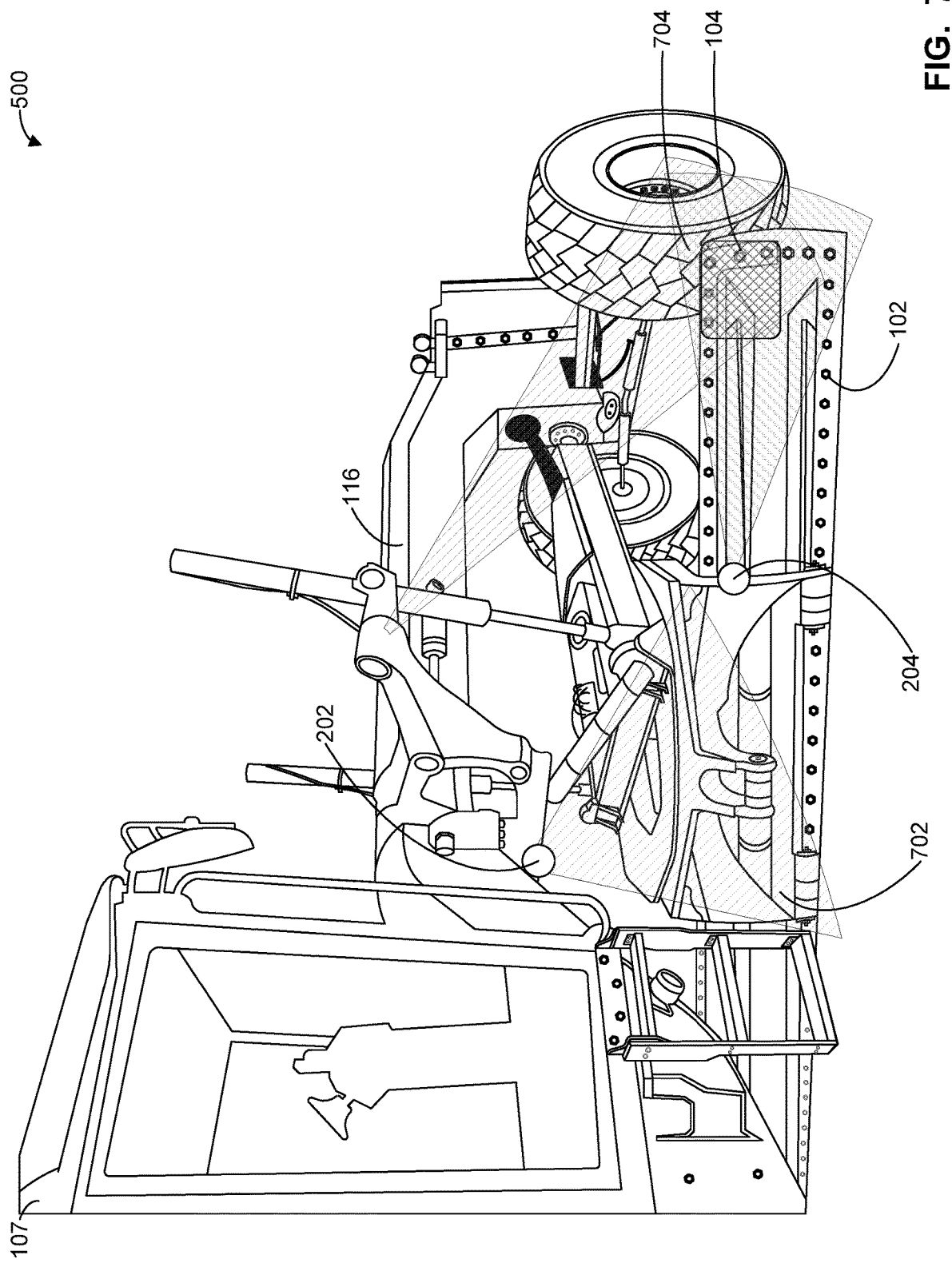

FIG. 7 illustrates the example work machine 500 of FIG. 5 with the first and second cameras 202, 204 in different locations as compared to FIGS. 5 and 6. As shown in the example of FIG. 7, the first camera 202 is coupled on an underside of the machine frame 116 to provide the first camera 202 with a first field of view 702 of the targets 103, 104 and the second camera 204 is coupled adjacent the working blade 102 to provide the second camera 202 with a second field of view 704 of the targets 103, 104. In the position of the working blade 102 shown in FIG. 7, the targets 103, 104 is included in the first and second fields of view 702, 704.

Figure 8:
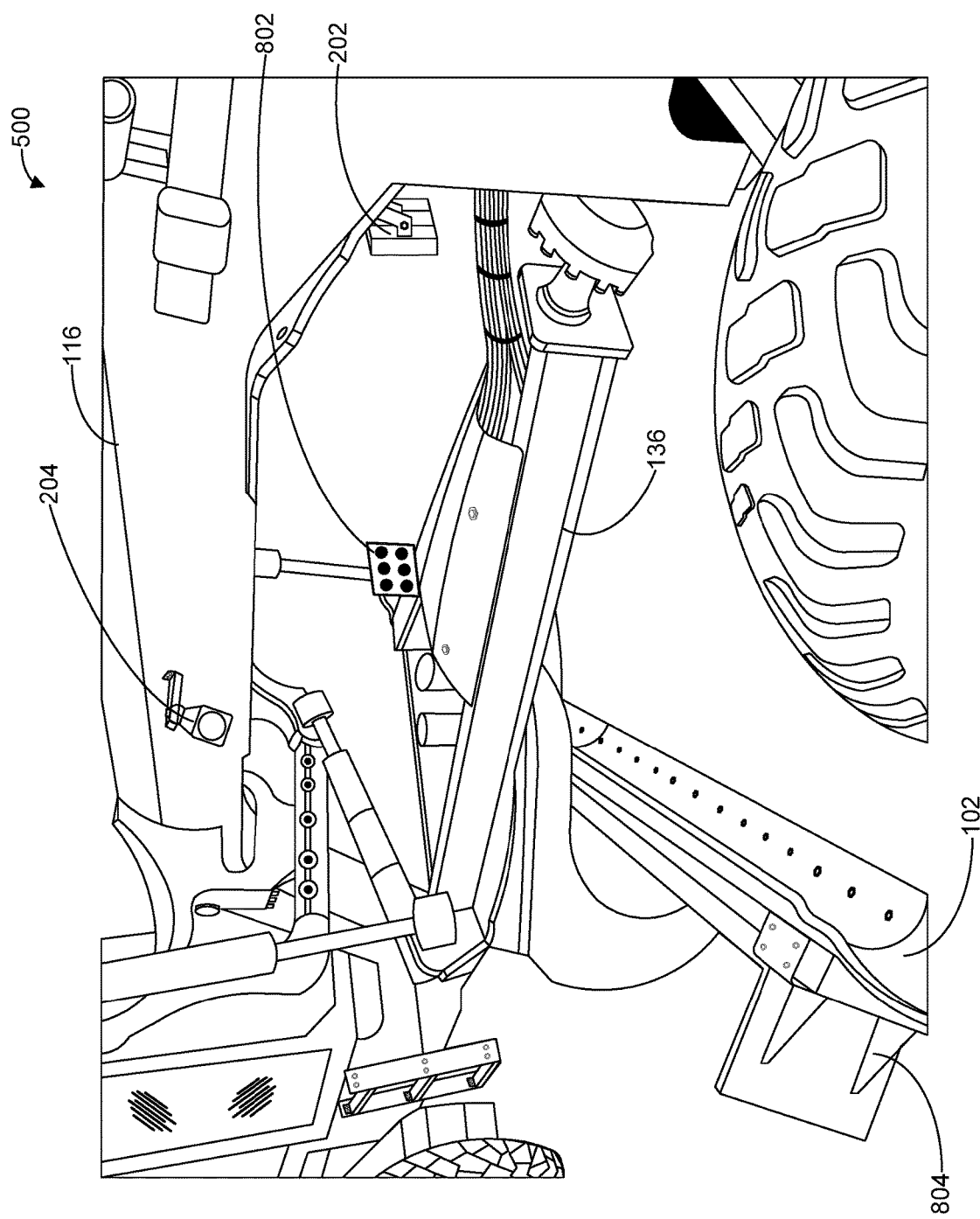

FIG. 8 illustrates the example work machine 500 of FIG. 5 with the first and second cameras 202, 204 in different locations as compared to FIGS. 5, 6 and 7. As shown in the example of FIG. 8, the first camera 202 is coupled on an underside of the machine frame 116 to provide the first camera 202 with a first field of view of a first target(s) 802 carried by the draft frame 136 and/or a second target(s) 804 carried by the working blade 102. In the illustrated example, the second camera 204 is coupled to a side of the machine frame 116 to provide the second camera 202 with a second field of view of the first and/or second targets 802, 804.

Figure 9:
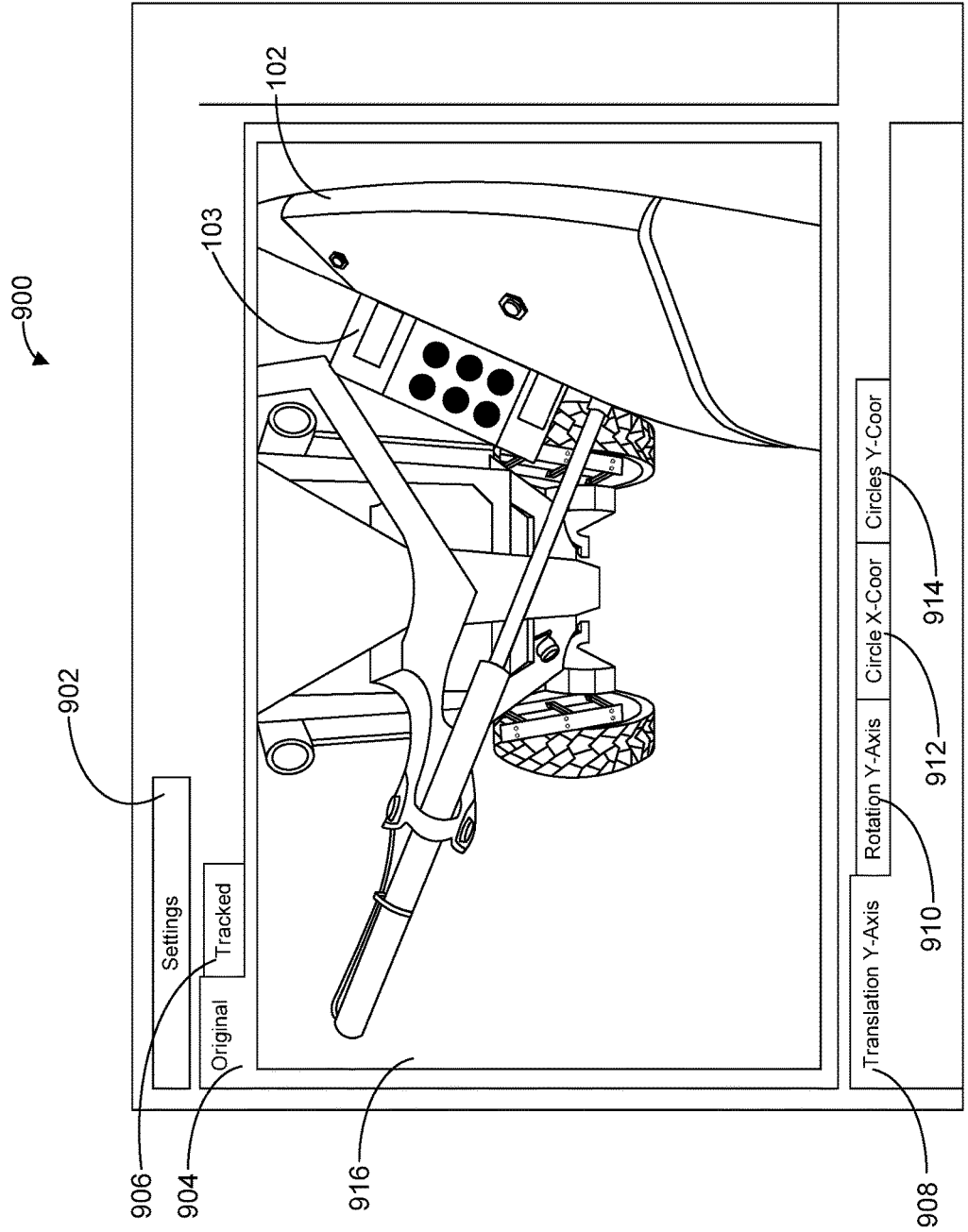
FIG. 9 illustrates an example display generated using the examples disclosed herein.

FIG. 9 illustrates an example display 900 generated based on the teaching of this disclosure. As shown in the illustrated example, the display 900 includes an example settings tab 902, an example original tab 904, an example tracked tab 906, an example translation Y-axis tab 908, an example rotation Y-axis tab 910, a circle X-coordinates tab 912 and a circle Y-coordinates tab 914. In the illustrated example, the original tab 902 and the translation Y-axis tab 908 are selected and an image and/or video 916 of the working blade 102 and/or the targets 103, 104 is being shown.

Figure 10:
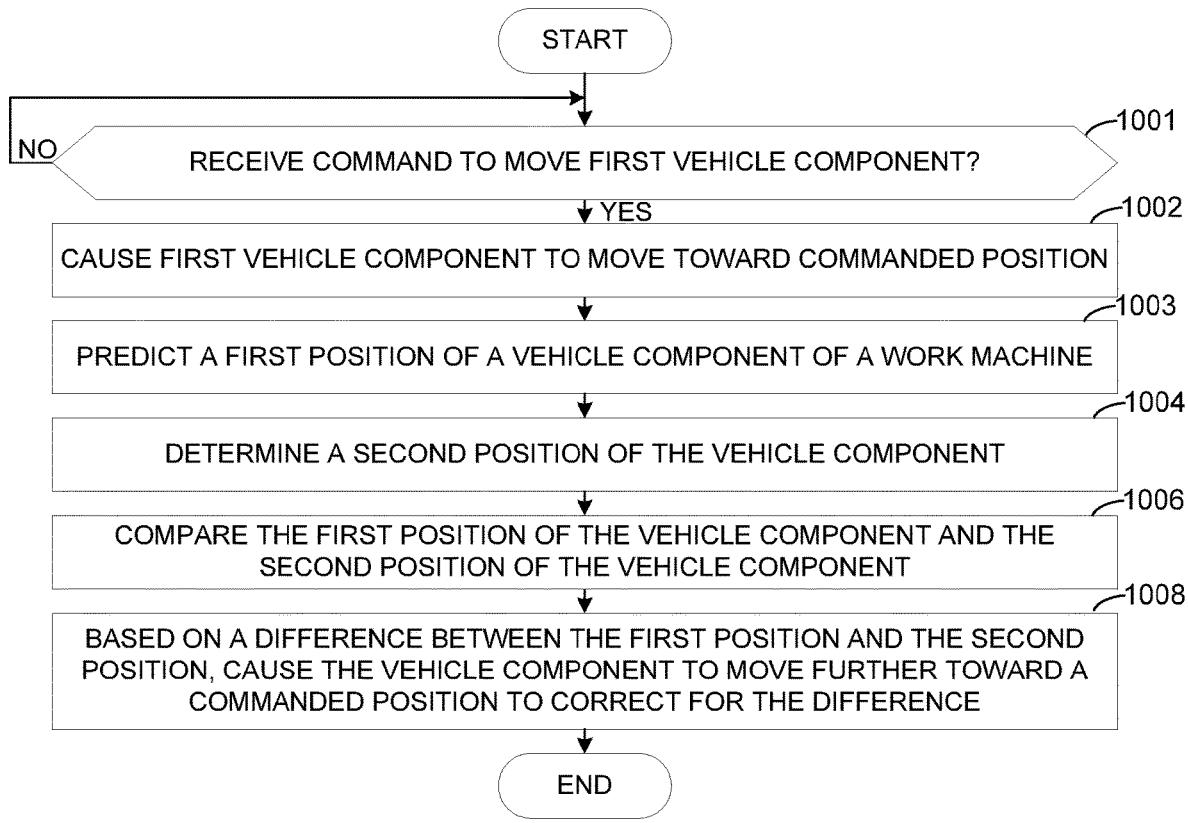
FIG. 10 is representative of machine readable instructions that may be executed to implement the working blade position controller of FIGS. 1, 2 and/or 4.
Figure 11:
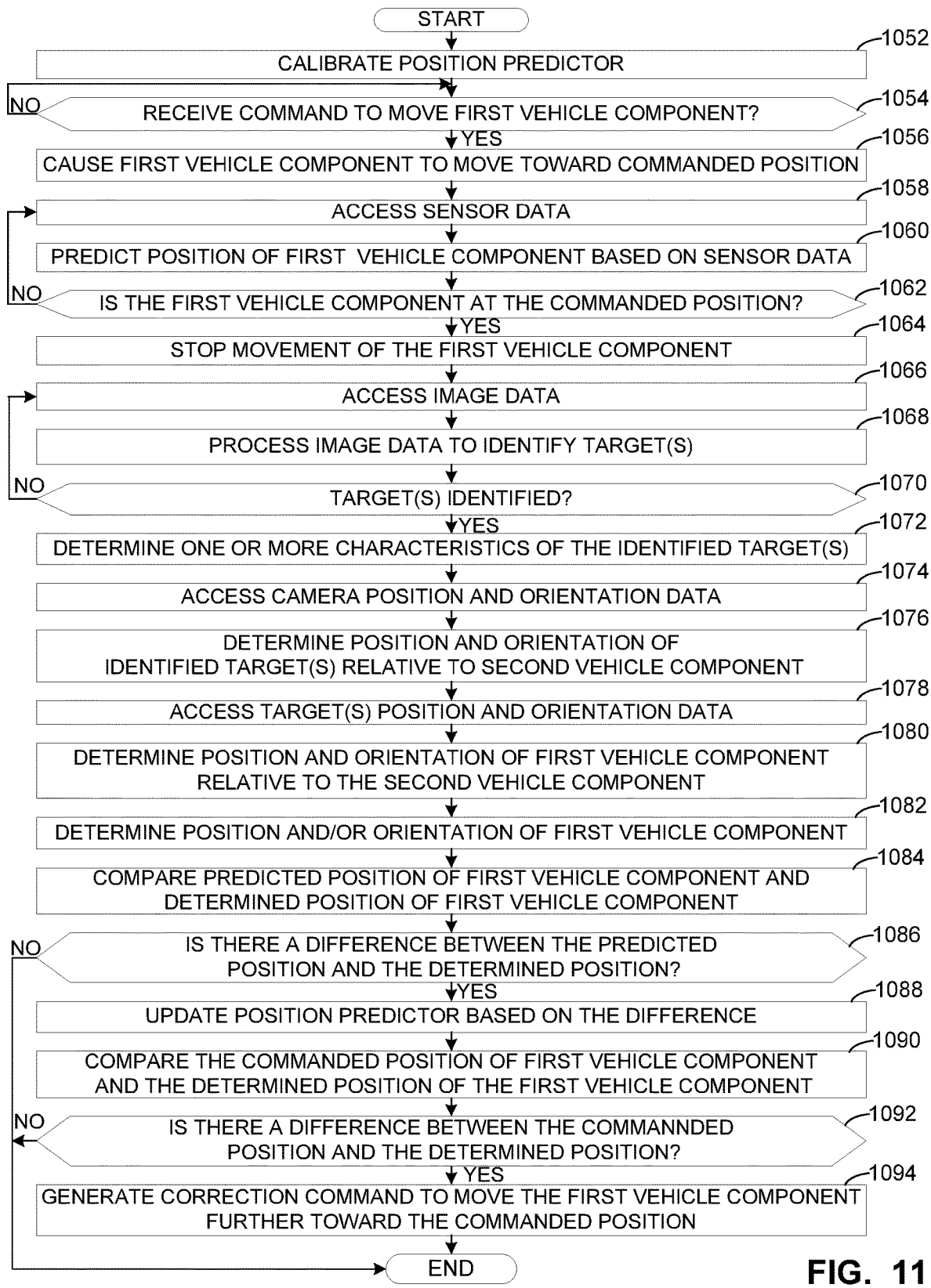
FIG. 11 is representative of machine readable instructions that may be executed to implement the working blade position controller of FIGS. 1, 2 and/or 4.

A flowchart representative of example machine readable instructions for implementing the working blade position controller 140 of FIG. 4 is shown in FIGS. 10 and 11. In this example, the machine readable instructions comprise a program for execution by a processor such as the processor 1112 shown in the example processor platform 1100 discussed below in connection with FIG. 12. The program may be embodied in software stored on a non-transitory computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 10 and 11, many other methods of implementing the example working blade position controller 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 10 begins at block 1001 with the actuator controller 416 determining if the command 210 is received to move the first vehicle component (e.g., the draft frame 136, the working blade 102) (block 1001). In examples in which a command 210 is received, the actuator controller 416 causes the first vehicle component to move toward the commanded position by, for example, generating the working blade position command 212 that commands one or more of the actuators 120, 122 and/or the 124 and/or the circle rotate 126 to move the working blade 102 toward the commanded position (block 1002).

At block 1003, the position predictor 402 predicts a first position of a vehicle component (e.g., the draft frame 136) of the work machine 100 using first processes (block 1003). In some examples, the prediction is associated with a commanded position and/or an expected position of the vehicle component and is determined using the sensor data 214. The position determiner 408 determines a second position of the vehicle component using second processes (block 1004). For example, the position determiner 408 may determine the second position (e.g., the measured/determined position) based on the image processor 404 accessing and processes the image data 216 to identify one or more targets 103, 104 within the image(s) of the image data 216. In response to the one or more targets 103, 104 and/or another characteristic of the work machine 100 (e.g., the fiducial 105) being identified, the position determiner 408 determines the position and/or orientation of the first vehicle component (e.g., the draft frame 136) and/or the relative position of the first vehicle component and the second vehicle component (e.g., the machine frame 116).

The comparator 406 compares the first position of the vehicle component and the second position of the vehicle component (block 1006). Based on a difference between the first position and the second position, the actuator controller 416 causes the vehicle component to move further toward the commanded position to correct for the difference (block 1008). For example, the actuator controller 416 generates the correction command 218 that moves the working blade 102 to account for a difference between the predicted position and the actual position and to move the working blade further toward the commanded position.

The program of FIG. 11 begins at block 1052 with the calibrator 401 calibrating the position predictor 402. In some examples, during the calibration process, the actuator controller 416 causes the first vehicle component (e.g., the draft frame 136, the working blade 102) to be moved to a known position and/or a neutral location. When the first vehicle component is in the known position, in some examples, the position predictor 402 predicts the position of the first vehicle component (e.g., draft frame 136) relative to the second vehicle component (e.g., machine frame 116) and/or the position of the targets 103, 104 and/or the position of the camera(s) 118. To calibrate the position predictor 402, the calibrator 401 compares the prediction(s) to a reference position(s) from the reference data 412. In examples in which an error(s) and/or a difference is identified, the calibrator 401 updates the position predictor 402 to enable a more accurate position of the camera 118 and/or the targets 103, 104 to be determined and/or to enable more accurate predictions to occur.

At block 1054, the actuator controller 416 determines if a command 210 is received to move the first vehicle component (e.g., the draft frame 136, the working blade 102) (block 1054). In examples in which a command 210 is received, the actuator controller 416 causes the first vehicle component to move toward the commanded position by, for example, generating the working blade position command 212 that commands one or more of the actuators 120, 122 and/or the 124 and/or the circle rotate 126 to move the working blade 102 toward the commanded position (block 1056).

In some examples, as the working blade 102 is being moved, the example position predictor 402 accesses the sensor data 214 (block 1058). Using the sensor data 214, the position predictor 402 predicts the position of the first vehicle component (block 1060). For example, the position predictor 402 may predict the position of the working blade 102, the position of the draft frame 136, the position of the machine frame 116, the position of the targets 103, 104 and/or the relative positioning of two or more components of the work vehicle 100. The comparator 406 compares the predicted position to the commanded position to determine if the values satisfy a threshold of one another and, more generally, to determine if the first vehicle component is at the commanded position (block 1062). In examples in which the values do not satisfy a threshold of one another, the actuator controller 416 continues to move the first vehicle component (e.g., the draft frame 136) via the working blade position command request 210 and the position predictor 402 continues to predict the position of the first vehicle component and/or another component of the work machine 100 using the sensor data 214 accessed.

In examples in which the predicted position satisfies a threshold of the commanded position, the actuator controller 416 stops moving the first vehicle component (block 1064). To directly measure and/or determine the position of the first vehicle component (e.g., the draft frame 136, the working blade 102), in the illustrated example, the image processor 404 accesses the image data 216 (block 1066) and processes the image data 216 to identify one or more targets 103, 104 within the image(s) of the image data 216 (block 1068). In some examples, processing the image data 216 includes the image processor 404 converting the image(s) within the image data 216 to a black and white image(s) and/or increasing and/or otherwise changing a contrast of the image(s) within the image data 216. Additionally or alternatively, in some examples, processing the image data 216 includes accounting for a parameter(s) of the camera 118, a position(s) of the fiducial 105 on the target 103, 104 and/or the pixel location of the fiducial(s) 105.

At block 1070, the image processor 404 determines if one or more of the targets 103, 104 have been identified within the processed image data 216 (block 1070). In examples in which the image processor 404 determines that one or more of the targets 103, 104 are present within the processed image data 216, the image processor 404 determines one or more characteristics of the identified targets 103, 104 such as, for example, pixel location of the fiducials 105 of the targets 103, 104, a size of one or more of the targets 103, 104 within the image(s), a location of one of one or more of the targets 103, 104 within the image, etc. (block 1072).

The position determiner 408 accesses the position and/or orientation of the camera(s) 118 from the database 410 (block 1074) and determines, using, for example, the position and/or orientation of the camera(s) 118, a position and/or orientation of the identified targets 103, 104 relative to a second vehicle component such as, for example, the machine frame 116 (block 1076). The position determiner 408 accesses one or more of a position and/or an orientation of the targets 103, 104 on the draft frame 136 and/or the position and/or an orientation of the targets 103, 104 relative to the machine frame 116 from the database 410 (block 1078). Using the determined position of the targets 103, 104, the relative position of the target(s) 103, 104 and the machine frame 116 and/or the position and/or orientation of the target(s) 103, 104 on the draft frame 136, the position determiner 408 determines the position and/or orientation of the first vehicle component (e.g., the draft frame 136) relative to the second vehicle component (e.g., the machine frame 116) (block 1080). In some examples, the position of the first vehicle component relative to the second vehicle component is determined based on the comparator 406 comparing the processed image data to the reference data 412. At block 1082, the position determiner 408 determines the position and/or orientation of the first vehicle component (e.g., the draft frame 136) based at least in part on the results of the processes at, for example, block 1080 (block 1082).

The comparator 406 compares the predicted position of the first vehicle component and the determined (e.g., the directly measured) position of the first vehicle component (block 1084) and the error identifier 414 determines if there is a difference between the predicted position and the determined position (block 1086). In examples in which the error identifier 414 identifies a difference between the predicted position and the determined position, the position predictor 402 is updated to enable subsequent predictions to have increased accuracy (block 1088).

The comparator 406 compares the determined/measured position of the first vehicle component and the commanded position of the work vehicle component (block 1090) and determines if there is a difference between the determined/measured position and the commanded position (block 1092). In examples in which there is a difference between the determined/measured position and the commanded position, the actuator controller 416 generates the correction command 218 that moves the working blade 102 further toward the commanded position and/or to account for the difference (block 1094). In other words, when the predicted position inaccuracy predicts the working blade 102 as being in the commanded position, the correction command 218 causes the working blade 102 to further move toward the commanded position.

Figure 12:
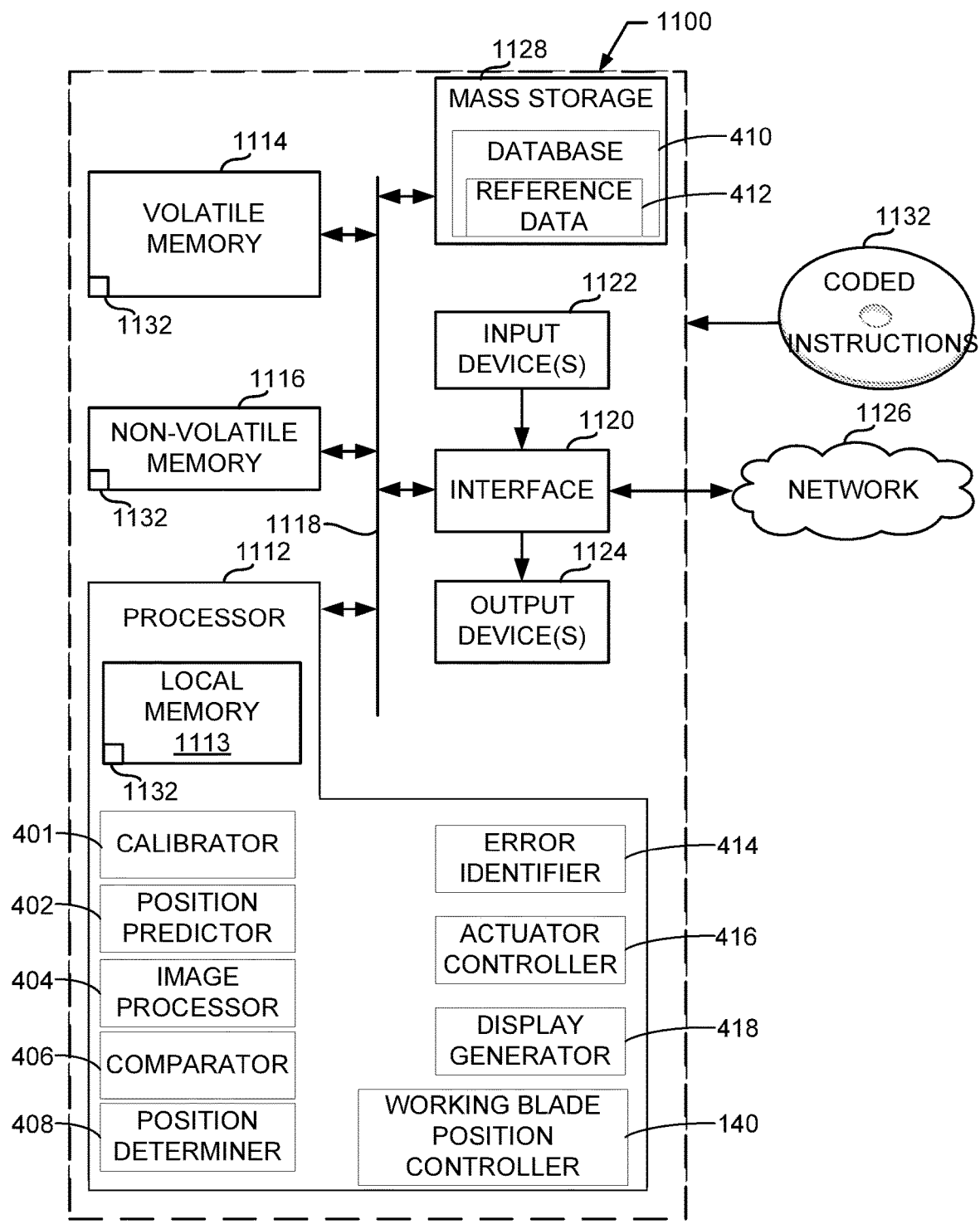
FIG. 12 is a processor platform to execute the instructions of FIGS. 10 and 11 to implement the working blade position controller of FIGS. 1, 2 and/or 4.

FIG. 12 is a block diagram of an example processor platform 1100 capable of executing the instructions of FIGS. 10 and 11 to implement the working blade position controller 140 of FIG. 4. The processor platform 1100 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor implements calibrator 401, the position predictor 402, the image processor 404, the comparator 406, the position determiner 408, the error identifier 414, the actuator controller 416, the display generator 418 and the working blade position controller 140.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface. In this example, the mass storage devices 1128 implement the database 410.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, disappoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 10 and 11 may be stored in the mass storage device 1128, in the volatile memory 1114, in the non-volatile memory 1116, and/or on a removable tangible computer readable storage medium such as a CD or DVD.

From the foregoing, it will be appreciated that example methods, apparatus and articles of manufacture have been disclosed that enable the position of a working blade of a work machine (e.g., a motor grader) to be determined within a threshold distance (e.g., sub-centimeter (cm) and/or sub-millimeter (mm)) without using position-determining masts extending from sides of the working blade, for example. The position-determining masts may be two meters long. Thus, by enabling the position and orientation of the working blade to be controlled and/or determined within a threshold distance, the examples disclosed herein can further deter the working blade from inadvertently colliding with a tire(s) of the work machine and/or inadvertently colliding with the cab of the work machine.

By enabling the position of the working blade to be determined without the inclusion of the position-determining masts and its associated sensor system, the cost of the motor grader may be reduced and/or the positional accuracy of the working blade determined may be increased. Additionally or alternatively, by enabling the position of the working blade to be determined without the inclusion of the position-determining masts and its associated sensor system, wiring associated with the position-determining masts and its associated sensor system may be removed from the working blade.

In some examples, the position of the working blade is determined using a camera(s). For example, the camera(s) may be used to track the position of the working blade. Thus, the examples disclosed herein enable a determined target(s) location to be translated to a physical location of the first vehicle component relative to the second vehicle component. In other words, the examples disclosed herein enable a target(s) tracked in pixel space to be translated to enable a location in real space to be determined. In some examples, by knowing the position of the camera and the orientation of the camera relative to the machine frame of the work vehicle and the relative location and orientation of the target(s) at different reference working blade positions, the examples disclosed herein determine and/or identify changes in the orientation(s) and/or location(s) of the target(s) and, in combination with kinematics of the work machine, the location and/or orientation of the draft frame relative the frame of the work vehicle.

In some examples, when the image processing identifies a target(s) and/or a fiducial(s), a prediction may be performed to predict where the identified target(s) and/or the fiducial(s) should appear in image pixel space. To correct for an error(s) and/or a difference between the measured/determined position and the predicted position, the vehicle component can be moved accordingly and/or the image processing may be updated to enable subsequent position determinations to be made with increased accuracy. Thus, the examples disclosed herein enable a position of a vehicle component (e.g., the draft frame) to be determined and/or corrected for in pixel space without measuring the actual real-world location and/or orientation of the target(s) and/or the fiducial(s) on the work machine.

In some examples, the examples disclosed herein enable work machines to be retrofitted and/or updated to provide fine grading and/or rough grading without adding and/or removing substantial hardware (e.g., the position-determining masts may be removed). Further, the examples disclosed herein enable image data to be filtered based on noise in the measurement, motion of a vehicle component (e.g., the draft frame) can be tracked between image frames, a location of a fiducial(s) can be predicted to enable a lesser portion of an image to be processed and/or enables data to be fused that is received at different and/or inconsistent rates. Additionally or alternatively, the examples disclosed herein increase an accuracy of a position determined by a camera using an additional sensor(s) and/or machine knowledge and/or increase an accuracy in a position determined using knowledge on error (e.g., error in a state prediction, error in a position determination) and/or performing a best fit (e.g., using a filter) to predict a value(s) of an error source(s).

Based on the position and/or orientation data determined and/or fused, the examples disclosed herein enable the position and orientation of the working blade to be determined relative to the machine frame and/or relative to gravity. In examples in which the position and orientation of the working blade is determined relative to gravity, sensor data from another senor may be used and/or fused. In some examples, a dedicated controller(s) is used to process the image data and/or to determine the orientation and/or position of the working blade. For example, a tracking algorithm for tracking the position of the working blade may be embedded in such a controller and/or another processor(s). Additionally or alternatively, in other examples, a processor(s) of the camera(s) and/or other components of the work machine is used to process the image data and/or to determine the orientation and/or position of the working blade.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this a patent.

What is claimed is:

1. A work machine, comprising:
   a position predictor to predict a first position of a vehicle component of the work machine using first processes-based on sensor data and a commanded position of the vehicle component;
   a position determiner to determine a second position of the vehicle component using second processes based on a location of a target within image data, the target coupled to the vehicle component;
   a comparator to compare the first position of the vehicle component and the second position of the vehicle component; and
   based on a difference between the first position and the second position, an actuator controller to cause the vehicle component to move further toward the commanded position to correct for the difference.

2. The work machine of claim 1, in response to the first position and the second position being different, the position predictor to perform an update process to enable future predictions to be made with increased accuracy.

3. The work machine of claim 1, wherein the position predictor is to predict the first position of the vehicle component using the first processes including processing sensor data from one or more sensors.

4. The work machine of claim 3, wherein the one or more sensors includes a sensor carried by an actuator of the work machine or a sensor carried by a circle rotate of the work machine.

5. The work machine of claim 1, wherein the position determiner is to determine the second position of the vehicle component using second processes including processing image data to identify one or more characteristics of interest and comparing the one or more characteristics of interest to reference data.

6. The work machine of claim 5, wherein the characteristics of interest include one or more of a target carried by the first vehicle component, a fiducial of the target, a size of the target, or an orientation of the target in an image.

7. The work machine of claim 5, wherein the position determiner is to associate the identified one or more characteristics of interest to a position parameter, the position parameter associating a position or an orientation of the characteristic of interest with at least one of a relative position between the first vehicle component and a second vehicle component of the work machine or a position of the first vehicle component.

8. A method, comprising:
   predicting, by executing an instruction with at least one processor, a first position of a vehicle component of a work machine using first processes based on sensor data and a commanded position of the vehicle component;
   determining, by executing an instruction with the at least one processor, a second position of the vehicle component using second processes based on a location of a target within image data, the target coupled to the vehicle component;
   comparing, by executing an instruction with the at least one processor, the first position of the vehicle component and the second position of the vehicle component; and
   based on a difference between the first position and the second position, causing, by executing an instruction with the at least one processor, the vehicle component to move further toward the commanded position to correct for the difference.

9. The method of claim 8, wherein in response to the first position and the second position being different, further including updating a prediction model associated with the predicting and the first processes to enable future predictions to be made with increased accuracy.

10. The method of claim 8, wherein the predicting of the first position of the first vehicle component using the first processes includes processing sensor data from one or more sensors.

11. The method of claim 10, wherein the one or more sensors includes a sensor carried by an actuator of the work machine or a sensor carried by a circle rotate of the work machine.

12. The method of claim 8, wherein determining the second position of the vehicle component using the second processes includes processing image data to identify one or more characteristics of interest and comparing the one or more characteristics of interest to reference data.

13. The method of claim 12, wherein the characteristics of interest includes one or more or a target carried by the first vehicle component, a fiducial of the target, a size of the target, or an orientation of the target in an image.

14. The method of claim 12, further including associating the identified one or more characteristics of interest to a position parameter, the position parameter associating a position or an orientation of the characteristic of interest with at least one of a relative position between the first vehicle component and a second vehicle component of the work machine or a position of the first vehicle component.

15. A non-transitory computer-readable medium comprising instructions that, when executed, cause a processor to, at least:
   predict a first position of a vehicle component of a work machine using first processes based on sensor data and a commanded position of the vehicle component;
   determine a second position of the vehicle component using second processes based on a location of a target within image data, the target coupled to the vehicle component;
   compare the first position of the vehicle component and the second position of the vehicle component; and based on a difference between the first position and the second position, cause the vehicle component to move further toward the commanded position to correct for the difference.

16. The computer-readable medium as defined in claim 15, wherein the instructions, when executed, further cause the processor to update a prediction model associated with the prediction and the first processes to enable future predictions to be made with increased accuracy when the first position and the second position are different.

17. The computer-readable medium as defined in claim 15, wherein the determination of the second position of the vehicle component using the second processes includes processing image data to identify one or more characteristics of interest and comparing the one or more characteristics of interest to reference data.

18. The computer-readable medium as defined in claim 17, wherein the characteristics of interest include one or more or a target carried by the first vehicle component, a fiducial of the target, a size of the target, or an orientation of the target.

19. The computer-readable medium as defined in claim 17, wherein the instructions, when executed, further cause the processor to associate the identified one or more characteristics of interest to a position parameter, the position parameter associating a position or an orientation of the characteristic of interest with at least one of a relative position between the first vehicle component and a second vehicle component of the work machine or a position of the first vehicle component.

20. A work machine, comprising:
a first vehicle component movable relative to a second vehicle component; and
a processor to:
cause the first vehicle component to move toward a commanded position;
predict a first position of the first vehicle component of the work machine using first processes based on sensor data and the commanded position;
determine a second position of the first vehicle component using second processes based on a location of a target within image data, the target coupled to the vehicle component; and
in response to a difference between the first position and the second position, to cause the first vehicle component to move further toward the commanded position to correct for the difference.

* * * * *